United States Patent
Mizuta

Patent Number: 5,700,221
Date of Patent: Dec. 23, 1997

[54] COOLING STRUCTURE OF AUTOMATIC TRANSMISSION

[75] Inventor: Muneo Mizuta, Fuji, Japan

[73] Assignee: Jatco Corporation, Fuji, Japan

[21] Appl. No.: 681,427

[22] Filed: Jul. 23, 1996

[30] Foreign Application Priority Data

Jul. 24, 1995 [JP] Japan ........................ 7-186851

[51] Int. Cl.$^6$ ............. F16H 45/00; F16D 13/20; F16D 13/52; F16D 13/64
[52] U.S. Cl. .......................................................... 475/146
[58] Field of Search .................................. 475/146, 159, 475/161

[56] References Cited

U.S. PATENT DOCUMENTS

| | | | |
|---|---|---|---|
| 3,131,582 | 5/1964 | Kelbel | 475/161 |
| 3,147,642 | 9/1964 | Erwin | 475/161 |
| 3,157,067 | 11/1964 | Tuck et al. | 475/159 |

FOREIGN PATENT DOCUMENTS 62-288753  12/1987  Japan.

Primary Examiner—Dirk Wright
Attorney, Agent, or Firm—Jacobson, Price, Holman & Stern, PLLC

[57] ABSTRACT

A cooling structure of an automatic transmission is provided which is capable of reducing the number of assembly parts and obtaining a high cooling efficiency by placing two heat sources away from each other. A high clutch device (15) is disposed between a front planetary gear device (13) and a rear planetary gear device (14) which is parallelly disposed in the direction in which an input shaft (4) in the front planetary gear device (13) extends. The high clutch device (15) includes a cylindrical clutch drum (15a), a clutch piston (15b) which slides in the direction of the input shaft (4) inside of the clutch drum portion (15a) and forms a piston-operating oil hydraulic chamber (20) in combination with the clutch drum portion (15a), and a plurality of clutch plates (15c) which are pressed by the clutch piston (15b) and laminated in the direction in which the input shaft (4) extends. The clutch drum (15a) is formed intetrally with a planetary carrier (18).

2 Claims, 4 Drawing Sheets

1

COOLING STRUCTURE OF AUTOMATIC TRANSMISSION

BACKGROUND OF THE INVENTION

1. Field of the Invention

This invention relates to a cooling structure of an autoseric transmission principally used for controlling the transmission of driving force in a vehicle.

2. Description of the Prior Art

As shown in FIGS. 3 and 4, there has been known a conventional automatic transmission is disclosed in, for example, Japanese Patent Application Early Laid-Open Publication No. Sho 62-288753.

Referring to FIGS. 3 and 4, a reverse clutch drum 5 is rotatably connected to a connecting shell 3 around an input shift 4 in a transmission case 2 of an automatic transmission 1.

In the reverse clutch drum 5, a reverse clutch device 6 and a high clutch device 7 are disposed parallel to the input shaft 4 On the outer surface of the reverse clutch drum 5, a brake band device 5a is disposed to control the rotation of the reverse clutch drum 5.

In the rear of the connecting shell 3, a front planetary gear device 8 and a rear planetary gear device 9 are disposed parallel to the input shaft 4.

A front planet carrier 8a in the front planetary gear device 8 is linked to a high clutch hub 7a in the high clutch device 7 through a cylindrical sleeve portion 7b.

A front sun gear 8b in the front planetary gear device 8 is linked to the reverse clutch drum 5 through the connecting shell 3.

A rear planet carrier 9a in the rear planetary gear device 9 is linked to a front internal gear 8c in the front planetary gear device 8 and is linked also to an output shaft (not shown) disposed coaxially with the input shaft 4.

For example, when the high clutch device 7 is mounted, the reverse clutch drum 5 is fixed to the transmission case 2 by mounting the brake band device 5a, and thereby the front sun gear 8b is also fixed thereto.

The rotational driving force input by the input shaft 4 is transmitted from the high clutch device 7 to the front planet carrier 8a via the high clutch hub 7a, and thereby a front planetary gear is rotated around the front sun gear 8b.

Accordingly, the rotation of the front internal gear 8c is accelerated, and thereby the output shaft connected to the rear planet carrier 9a is rotated at higher speed than the input shaft 4.

Oil paths 4a and 7c are formed in the input shaft 4 and the high clutch hub 7a, respectively. When rotated, lubricating oil is supplied to the front planetary gear device 8 and the rear planetary gear device 9 through the oil paths 4a and 7c.

However, in this type of automatic transmission, it is known that both of the front planetary gear device 8 and the rear planetary gear device 9 become heat sources due to the heat generated by friction between the gear devices 8 and 9, if the front planetary gear device 8 and the rear planetary gear device 9 are rotated under a load even if a predetermined quantity of lubricating oil is supplied through the oil paths 4a and 7c.

There is a fear that thermal expansion will occur to a clutch drum 11 and the like which are disposed around both of the front planetary gear device 8 and the rear planetary gear device 9 because the generated heat stagnates in the area of the two heat sources disposed close to each other.

In addition, the front sun gear 8b must be linked to the high clutch hub 7a in the high clutch device 7 through the connecting shell 3 although the high clutch hub 7a is linked to the front planet carrier 8a. Therefore, the sleeve portion 7b must be formed inside of the front sun gear 8b so as to be extended to a side face of the front planetary gear device 8 opposite to the high clutch device 7.

Therefore, disadvantageously, the quantity of the sleeve portion 7b must be increased for its extension and, in addition, it is difficult to sufficiently obtain the centering accuracy of the front sun gear 8b because the sleeve portion 7b is located inside of the front sun gear 8b so as to be overlapped. The centering accuracy of the front sun gear 8b influences the engagement accuracy of the gears, and therefore inadequate accuracy will cause the generation of heat.

SUMMARY OF THE INVENTION

An object of the present invention is to provide a cooling structure of an automatic transmission which is capable of gaining a high cooling efficiency by reducing the number of assembly parts and putting two heat sources away from each other.

The cooling structure of the automatic transmission according to an aspect of the present the invention is characterized in that the cooling structure of the automatic transmission comprises a multiple-plate clutch device disposed between a first planetary gear train and a second planetary gear train disposed in a direction of a rotation axis of the first planetary gear train. The multiple-plate clutch device includes a cylindrical clutch drum, a clutch piston which slides in the clutch drum in the direction of the rotation axis of the first planetary gear train and forms a piston-operating oil hydraulic chamber between the clutch piston and the clutch drum, and a plurality of clutch plates which are pressed by the clutch piston and laminated in the direction of the rotation axis. The clutch drum is formed integrally with a planetary carrier of the first planetary gear train.

In the cooling structure of the automatic transmission according to the aspect of the present invention, the first planetary gear train has an oil lubricated path, connected to the piston-operating oil hydraulic chamber, for supplying a piston operating oil to the piston-operating oil hydraulic chamber and lubricating gears of the first planetary gear train with the piston operating oil.

According to the aforementioned cooling structure, since the multiple-plate clutch device is disposed between the first planetary gear train and the second planetary gear train which is disposed in the direction of the rotation axis of the first planetary gear train, the two heat sources are put away from each other. According, a heat radiation area is increased and thereby a high cooling efficiency can be obtained.

In addition, since the clutch drum is formed integrally with the planetary carrier in the first planetary gear train, the number of assembly parts can be reduced and there is no need to form the sleeve portion used for the linkage with the planetary carrier inside of the front sun gear in the first planetary gear train. Accordingly, the number of assembly parts can be further reduced. In addition, the quantity of heat being generated can be decreased by improving a centering accuracy of the sun gear.

Further, according to the cooling structure of the present invention, the piston operating oil is supplied to the piston-operating oil hydraulic chamber through the oil lubricated path and the gear in the first planetary gear train is lubricated with the oil. Accordingly, the piston operating oil to which a pressure has been applied is forcibly supplied to the gear in the first planetary gear train when the piston is operated, and therefore a high cooling efficiency can be further realized.

DETAILED DESCRIPTION OF THE EMBODIMENTS

An embodiment of the present invention will be hereinafter described with reference to the accompanying drawings.

Figure 1:
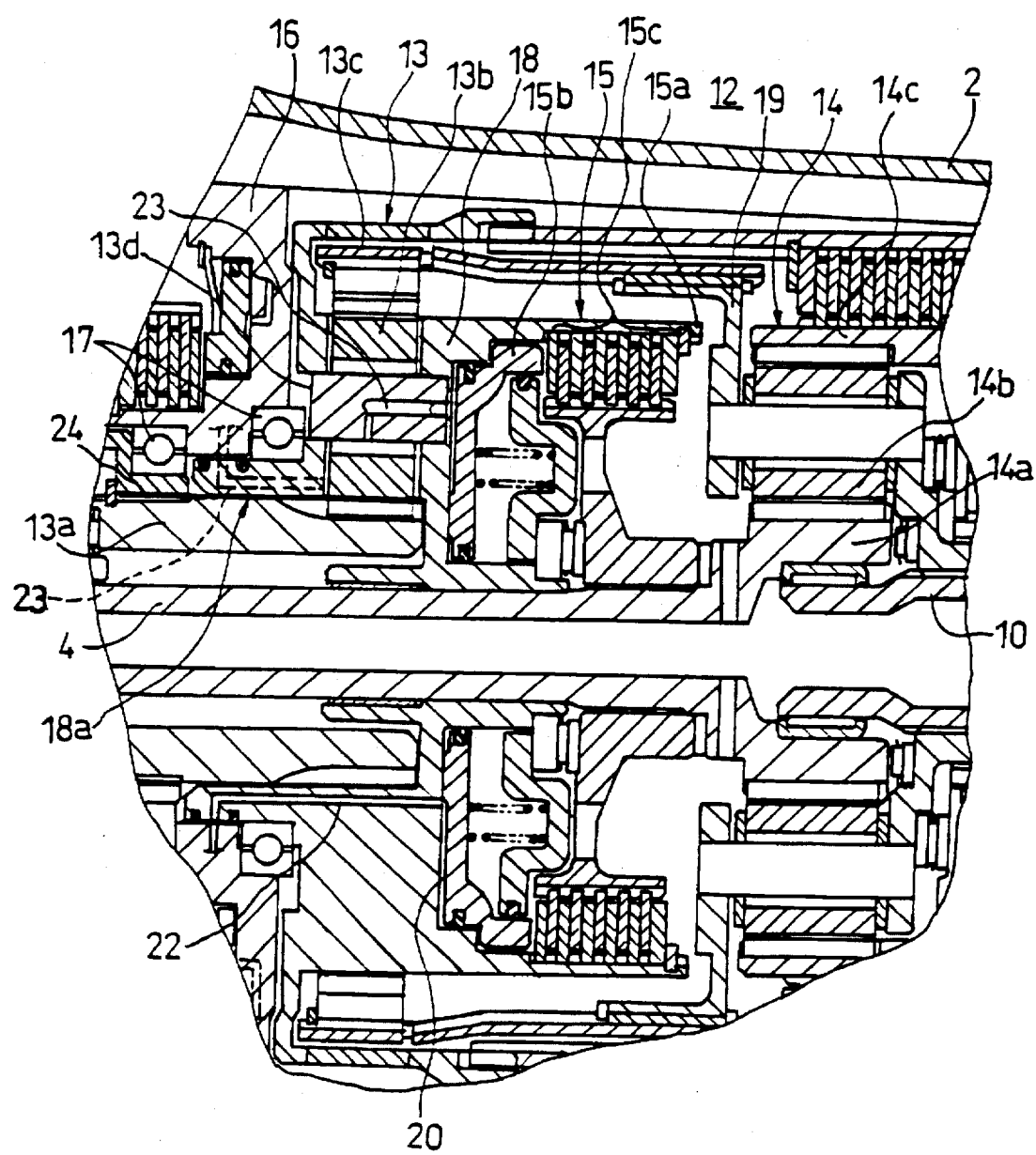
FIG. 1 is a partially sectional view of a cooling structure of an automatic transmission according to an embodiment of the present invention, taken along the direction of a rotation axis of the automatic transmission and on the line A—A of FIG. 2.

FIG. 1 shows an embodiments of the present invention. In this embodiment, the same numerals are each given to the same constituent parts as those of the conventional automatic transmission.

First, a constitution will be described. In a cooling structure of an automatic transmission according to the present invention, a front planetary gear device 13 serving as a first planetary gear train is disposed in a transmission case 2 of an automatic transmission 12.

The front planetary gear device 13 comprises mainly a front sun gear 13a, a plurality of front planetary gears 13b, 13b, . . . , and a front internal gear 13c which are disposed around an input shaft 4a serving as a rotation axis. The front sun gear 13a is rotatably supported by deep groove ball bearings 17, 17, etc. which are fitted into a drum support 16 fixed to the inside of the transmission case 2. At the same time, the front sun gear 13a is splined and connected to a shell connector 24 with predetermined play for its centering. The front planetary gears 18b are rotatably supported by a front planetary carrier 18 and are engaged with the front sun gear 13a. The front internal gear 13c is disposed around the front planetary gears 13b and is engaged with the respective planetary gears 13b.

As mentioned above, the front sun gear 13a is provided with predetermined play due to the spline-connection to the shell connector 24 supported by the left-handed one (in FIG. 1) of the two deep groove ball bearings 17, 17 fitted into the drum support 16, and the gear surface centering of the front sun gear 13a is carried out by the front planetary gears 13b supported by the front planetary carrier 18 at its axis portion 13d.

Figure 2:
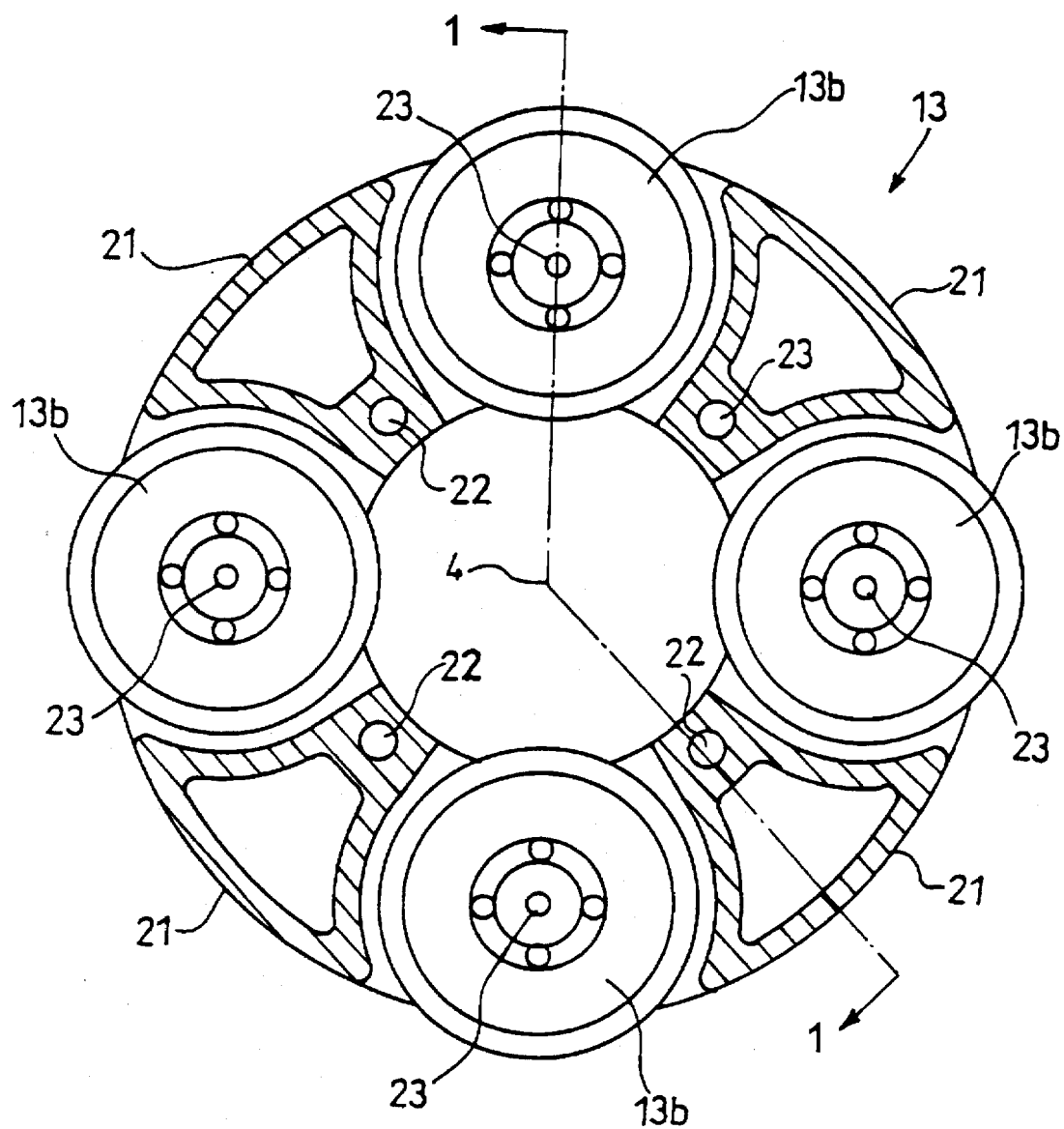
FIG. 2 is a side view of the cooling structure of the automatic transmission according to the embodiment of the invention.
Figure 3:
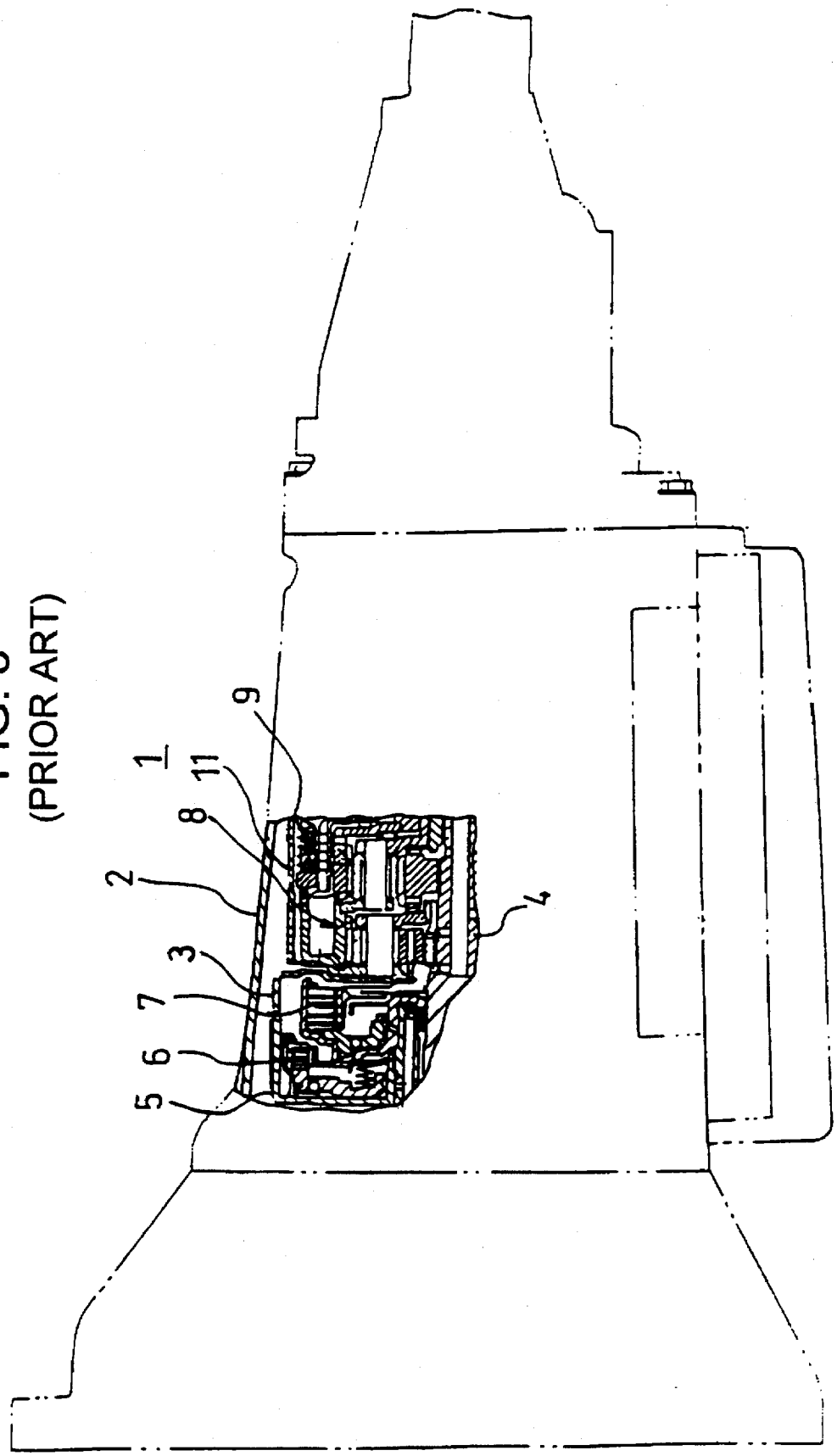
FIG. 3 is a sectional view of a drum structure of a conventional automatic transmission, along a rotation axis of the automatic transmission.
Figure 4:
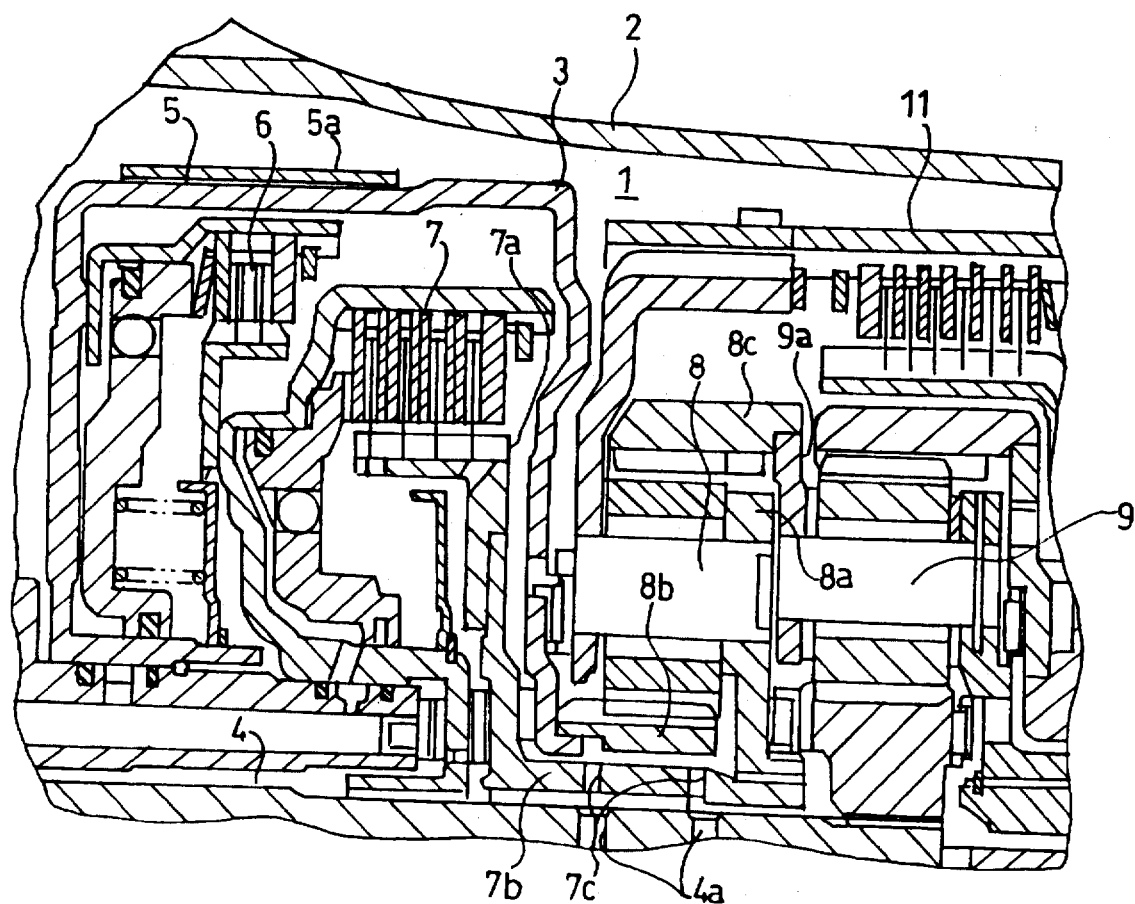
FIG. 4 is a partially enlarged sectional view of the drum structure of the conventional automatic transmission.

Between the front planetary gears 13b and 13b, a base plate 21 is disposed as shown in FIG. 2.

In this embodiment, the front sun gear 13a is supported in the transmission case 2 to be freely rotated by means of the shell connector 24 and a part 18a of the front planetary carrier 18 supported by the deep grooved ball bearings 17, 17 fitted in the drum support 16.

In the rear of the front planetary gear device 13, a rear planetary gear device 14 serving as a second planetary gear train is parallelly disposed in the direction of the rotation axis.

The rear planetary gear device 14 comprises a rear sun gear 14a which is linked to the input shaft 4 and is rotated, a plurality of rear planetary gears 14b, 14b, which are rotatably supported by a rear planetary carrier 19 and are engaged with the rear sun gear 14a, and a rear internal gear 14c which is disposed around the rear planetary gears 14b and is engaged with the respective rear planetary gears 14b.

The rear planetary carrier 19 is linked to the internal gear 13c in the front planetary gear device 13 and is linked also to an output shaft 10 disposed coaxially with the input shaft 4.

A high clutch device 15 as a multiple-plate clutch is disposed between the front planetary gear device 13 and the rear planetary gear device 14.

A cylindrical clutch drum 15a is formed integrally with the front planetary carrier 18 in the high clutch device 15. A clutch piston 1ob is disposed in the clutch drum portion 15a. The clutch piston 15b slides in the direction in which the input shaft 4 extends, and a piston-operating oil hydraulic chamber 20 is formed between the clutch piston 1ob and the clutch drum 15a.

In the clutch drum 15a, a plurality of clutch plates 15c are disposed which are pressed by the clutch piston 15b and are laminated in the direction of the rotational axis of the input shaft 4. According to the sliding movement of the clutch piston 15b, the connection or disconnection of the high clutch device 15 is carried out.

High-clutch oil hydraulic circuits 22 are formed in the base plates 21. The circuits 22 are connected to the piston-operating oil hydraulic chamber 20 and serve as a part of oil lubricated paths for supplying a piston operating oil to the piston-operating oil hydraulic chamber 20.

Oil paths 23 are formed in the axis portions 13d of the front planetary gears 13b, respectively. The oil paths connected to the piston-operating oil hydraulic chamber 30 and serve as a part of oil lubricated paths for supplying the piston operating oil and lubricating the pinion gears 13b, the axis portions 13d, needle washers, etc. in the front planetary gear device 13.

The operation in this embodiment will now be described.

In the automatic transmission according to the embodiment, the high clutch device 15 is disposed between the front planetary gear device 13 and the rear planetary gear device 14 parallelly disposed in the direction in which the input shaft 4 penetrating the center of the front planetary gear device 13 extends. Accordingly, the two heat sources are placed away from each other and, as a result, a heat radiation area is increased to enhance a cooling efficiency.

The clutch drum portion 15a in the high clutch device 15 is formed integrally with the front planetary carrier 18 in the front planetary gear device 13. Accordingly, the number of assembly parts can be reduced. This makes it possible to shorten the overall length of the transmission case 2 of the automatic transmission 1.

In addition, there is no need to form the sleeve portion 7b, which is used for the link with the front planetary carrier 18, inside of the front sun gear 13a in the front planetary gear device 13 as in the prior art transmission. Therefore, also in this respect, the number of assembly parts can be reduced.

Furthermore, in this embodiment, the front sun gear 13a is provided with predetermined play due to the spline-connection to the shell connector 24 supported by the left-handed one (in FIG. 1) of the two deep groove ball bearings 17, 17 fitted into the drum support 16, and the gear surface centering of the front sun gear 13a is carried out by the front planetary gears 13b supported by the front planetary carrier 18 at its axis portion 13d. In the front planetary carrier 18, the part 18a thereof is supported by the drum support 16 through the aid of the right-handed bearing 17 shown in FIG. 1.

Since the drum support 16 is fixed to the transmission case 2, the centering accuracy of the front sun gear 13a is increased. Accordingly, the quantity of heat to be generated is decreased.

The piston operating oil is supplied to the piston-operating oil hydraulic chamber 20 through the high-clutch oil hydraulic circuits 22 and is supplied through the oil paths 23 to lubricate the gears 13a–13c in the front planetary gear device 13.

Since the piston operating oil has a predetermined pressure, the piston operating oil is forcibly supplied to the gears 13a–13c when the high clutch device 15 is set up.

Accordingly, if the front planetary gear device 13 is rotated with a lead, the piston operating oil to which a pressure has been applied is forcibly supplied to the gears 13a–13c. Therefore, a high cooling efficiency is realized.

The details of the embodiment of the present invention was described with reference to the attached drawings, as mentioned above. However, the present invention is not limited to this embodiment. The present invention may be embodied in other modifications without departing from the spirit or essential characteristics of the present invention.

in the aforementioned embodiment, the front planetary gear device 13 is used as a first planetary gear train, and the rear planetary gear device 14 is used as a second planetary gear train. Instead, other planetary gear devices, such as reduction planetary gear devices, may be disposed in the direction of the rotation axis of the front planetary gear device 13 or the rear planetary gear device 14.

Further, in the aforementioned embodiment, the high clutch device 15 is used as a multiple-plate clutch device disposed between the front planetary gear device 13 and the rear planetary gear device 14. However, the present invention is not limited to this. For example, a multiple-plate clutch device, such as a reverse clutch device, a forward clutch device, an overrun clutch device, or a direct clutch device, may be disposed between the front planetary gear device 23 and the rear planetary gear device 14, or a disk brake device including a multiple-plate clutch device, such as a low- and-reverse brake, may be disposed therebetween 14.

As mentioned above, according to an aspect of the present invention, a multiple-plate clutch device is disposed between the first planetary gear train and the second planetary gear train which is parallelly disposed in the direction of the rotation axis of the first planetary gear train.

Accordingly, the two heat sources are placed away from each other and thereby a heat radiation area is increased to enhance a cooling efficiency.

The clutch drum portion is formed integrally with the front planetary carrier as a first planetary gear train. Accordingly, the number of assembly parts can be reduced. In addition, there is no need to form the sleeve portion, which is used for the link with the front planetary carrier 16, inside of the front sun gear as a first planetary gear train. Therefore, also in this respect, the number of assembly parts can be reduced. In addition, the centering accuracy of the sun gear can be increased, and the quantity of heat being generated is decreased.

According go another aspect of the present invention, the piston operating oil is supplied to the piston-operating oil hydraulic chamber through the high-clutch oil hydraulic circuits and is supplied through the oil paths to lubricate the gears in the first planetary gear train.

Accordingly, when a piston is operated, a piston operational oil is forcibly supplied to the gears in the first planetary gear train. Therefore, a high cooling efficiency can he obtained.

What is claimed is:

1. A cooling structure of an automatic transmission comprising:

a multiple-plate clutch device disposed between a first planetary gear train and a second planetary gear train, said second planetary gear train being parallelly disposed in a direction of a rotation axis of said first planetary gear train, said multiple-plate clutch device including:

a cylindrical clutch drum;

a clutch piston which slides in said clutch drum in the direction of said rotation axis of said first planetary gear train and forms a piston-operating oil hydraulic chamber between said clutch piston and said clutch drum; and a plurality of clutch plates which are pressed by said clutch piston and laminated in the direction of said rotation axis;

wherein said clutch drum is formed integrally with a planetary carrier of said first planetary gear train.

2. A cooling structure of an automatic transmission as defined by claim 1, wherein said first planetary gear train has an oil lubricated path, connected to said piston-operating oil hydraulic chamber, for supplying a piston operating oil to said piston-operating oil hydraulic chamber and lubricating gears of said first planetary gear train with the piston operating oil.

* * * * *